Feb. 9, 1943.                     H. H. LEIB                    2,310,448
                              DENTAL APPARATUS
                           Filed March 11, 1940
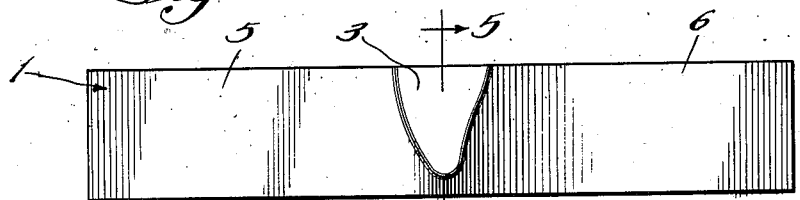
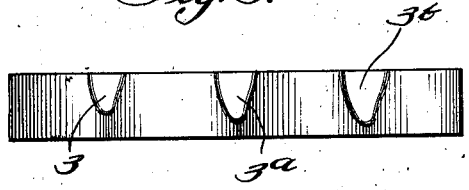        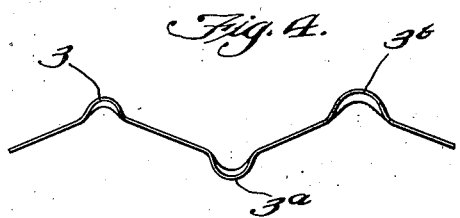
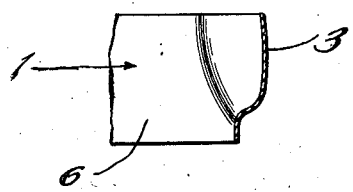        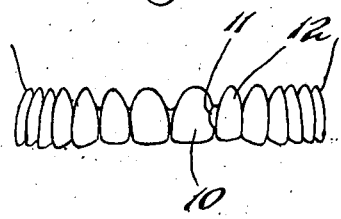
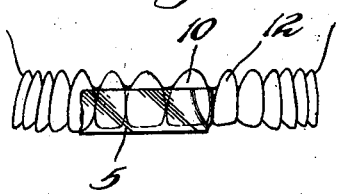
INVENTOR.
Henry H. Leib
BY Morris Spector
ATTORNEY.

Patented Feb. 9, 1943

2,310,448

UNITED STATES PATENT OFFICE 2,310,448

DENTAL APPARATUS

Henry H. Leib, Chicago, Ill.

Application March 11, 1940, Serial No. 323,467

5 Claims. (Cl. 32—63)

This invention relates to the dental arts, and more particularly to means for facilitating the molding of the outer surface of a filling in a tooth cavity to the correct contour of the tooth.

In the making of a dental filling of a cavity at the side of a tooth it is frequently very difficult to make the outer surface of the molded filling of exactly the shape required. This condition is especially true if the side cavity to be filled is in very close proximity to an adjacent tooth, more particularly in the case of a filling in the proximal surface of a central incisor, a lateral incisor, or a canine tooth. The present invention is particularly useful in making fillings for class three and class four type of cavities. Class three cavities are those in the proximal surface of incisors and cuspids where it is not necessary to restore the incisal angle. Class four cavities are those in which the incisal angle has either been lost or can not be safely retained.

It is one of the objects of the present invention to provide means which can be inserted in the interproximal space between adjacent teeth, and which is preformed to act as a mold for the outer surface of a dental filling in a tooth, more particularly a filling of the cement type. In accordance with the teachings of the present invention a strip of flexible resilient material, of sufficient thinness to permit insertion between adjacent teeth, is permanently deformed at one place to impart to said strip, at said place, a shape which is a counterpart of a proximal surface of a tooth. In filling a cavity at a proximal surface of the tooth the usual type of cement or similar mix is used. The cavity is prepared in the usual manner, the molding strip is inserted in the interproximal space and then the cavity is filled. The ends of the strip are then drawn taut to press the premolded or preformed part of the strip into firm contact with the surface of the tooth of which it is a counterpart. The outer surface of the setting cement filler of the cavity will be molded to the contour determined by the shape of the molded or preformed part of the strip. By this means contact will also be reestablished with the adjacent tooth.

In accordance with the teachings of the present invention, strips will be provided in sets, different strips being molded to constitute counterparts of surfaces of different teeth. For instance, in one strip the molded preformed part is a counterpart of a distal surface of one incisor, in another strip it is a counterpart of the opposite proximal surface of an incisor, in another strip it is a counterpart of one proximal surface of an upper canine, in another strip it is a counterpart of the opposite proximal surface of an upper canine, etc. For each proximal surface of a given tooth a number of different counterparts may be provided, for instance, one for an average small size tooth, one for an average medium size tooth, and one for an average large tooth. The different sized counterparts of the same proximal surface of a given tooth such as, for instance, an upper lateral incisor, may be on different strips of the set, or may be on the same strip of the set.

The ribbon used is preferably of a thermoplastic smooth material, such as Cellophane, Celluloid, Pyroxylin, Vinylite, or any of the other known thermo-plastic materials which can be made in sufficiently thin sheets to permit insertion into the human mouth between adjacent teeth and yet have the necessary strength. The material is one in which the counterpart of the desired part of the tooth can be formed by pressing the sheet between heated male and female dies of the requisite shape. After removal from the dies, the material will retain the form to which it has been pressed, and yet be of sufficient resiliency to permit partial straightening thereof to coincide more closely to the contour of the tooth of the particular patient in whose mouth it is being used.

The attainment of the above and further objects of the present invention will be apparent from the following specification taken in conjunction with the accompanying drawing forming a part thereof.

In the drawing:

Figure 1 is a front view of a ribbon having impressed thereon a counterpart of the side of an upper central incisor;

Figure 2 is a view of the ribbon taken at right angles to Figure 1;

Figures 3 and 4 are views corresponding to Figures 1 and 2, respectively, and illustrating a modified construction;

Figure 5 is a fragmentary sectional view taken along the line 5—5 of Figure 1;

Figure 6 is a diagrammatic view of a set of upper front teeth showing a cavity at one proximal surface of a central incisor;

Figure 7 is a view showing the use of the strip of Figure 1 for holding a cementitious filling for the cavity of Figure 4; and Figure 8 is a fragmentary sectional view illustrating the position of the molding strip, said view being at right angles to that of Figure 7.

Reference may now be had more particularly to Figures 1, 2 and 5. In these figures there is shown, at 1, a thin ribbon of thermo-plastic material such as, for instance, Cellophane, Celluloid, Pyroxylin, Vinylite, or the like. While a thermo-plastic material is preferable, any other substance may be used which is sufficiently thin to permit forcing the same into place between adjacent teeth in the mouth and which can be preformed to the shape of a portion of a tooth. The ribbon 2 is deformed, as indicated at 3, to the shape of one proximal surface of a tooth such as, for instance, that of a central incisor. The deformation 3 may be formed by pressing the ribbon between heated male and female dies that are of the shape of the distal edge of an average central incisor. The formed part 3 is intermediate the ends of the ribbon, leaving extensions 5 and 6 on opposite sides of the formed part 3 for handling of the ribbon. The material of the ribbon 1 is quite smooth and is of the type to which the usual dental cements such as, for instance, silicate cements, do not adhere.

In Figure 6 there are illustrated the upper front teeth in a human mouth, of which a central incisor, indicated at 10, has a cavity 11 at the distal surface. The space between the tooth 10 and the adjacent tooth 12 is insufficient to permit convenient proper molding of the outer surface of a cementitious filling in the cavity 11. In accordance with the principles of the present invention the cavity is prepared in the usual manner. A strip 1 is then chosen which has a preformed molded indentation 3 which corresponds to an average distal surface of a medium size central incisor. The strip is inserted between the tooth 10 and the adjacent tooth 12, with the preformed part 3 adjacent the distal surface of the tooth 10, about which it fits snugly. At this time the extension 5 of the ribbon is on the outside of the mouth and the extension 6 is on the inside of the mouth. The cavity is then filled with the usual cementitious filling 15. The dentist then draws the extensions 5—6 tightly towards the distal surface of the tooth 10. The preformed part 3 retains its general shape and yet is sufficiently yielding so that it can and does deform slightly to coincide exactly with the actual shape of the distal surface of the tooth. The outer surface of the cementitious filling is thus molded to the requisite shape by the ribbon part 3. The dentist holds the ribbon in place until the cementitious filler has set. The ribbon is then removed and may be discarded.

While Figures 1 and 2 show a ribbon having only one indentation 3, said ribbon may have a number of indentations corresponding to the indentation 3 therein, the different indentations being for the distal surfaces of different sized normal central incisors or other teeth. This is illustrated in Figures 3 and 4. The dentist uses the small, medium or large preformed parts 3, 3a, or 3b of the ribbon, depending upon the size of the tooth being treated. The ribbons may be sold in a set of, say, twelve, to take care of the labial and distal surfaces of the upper and lower central and lateral incisors and canine teeth. If each ribbon has three preformed indentations for teeth of different sizes then the set may comprise twelve such ribbons. If each ribbon contains only one indentation then the set should contain thirty-six such ribbons to take care of the three possible sizes of each of the twelve above mentioned surfaces.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A comparatively long narrow ribbon having a portion thereof preformed to constitute a counterpart of a normal surface of a human tooth, said ribbon being sufficiently thin to enter the interproximal space in the mouth to permit the ribbon to be tensioned around a tooth, the preformed portion of the ribbon extending with its vertical axis across the ribbon so that upon insertion of that portion into the interproximal space the parts of the ribbon adjacent said portion extend across the adjacent teeth and constitute gripping parts for tensioning the ribbon, said ribbon being sufficiently flexible to permit deformation of the preformed part under tension to deform it to the actual shape of the adjacent part of the tooth.

2. Means for molding the outer surface of a filling in the proximal surface of an anterior tooth in the mouth to the requisite shape, said means comprising a flexible smooth ribbon sufficiently thin to enter the interproximal spaces, an intermediate portion of the ribbon being preshaped to constitute a counterpart of a normal proximal surface of the tooth and the portions of the ribbon on opposite sides of the preshaped part constituting means for pulling the preshaped part towards a proximal surface of an anterior tooth.

3. Means for molding the outer surface of a filling in a tooth in the mouth, said means comprising a smooth surfaced member preshaped to constitute a counterpart of the adjacent surface of the tooth and of the surface required at the outside of the filling, said member being adapted to embrace less than 360° of the tooth surface, and tensioning extensions projecting from the preformed part of the member for pulling the preformed part of the member taut against the tooth.

4. Means for molding the outer surface of a filling in the proximal surface of a tooth in the mouth, said means comprising a smooth surfaced member preshaped to constitute a counterpart of a proximal surface of the tooth as required at the outside of the filling, said member being adapted to embrace less than 360° of the tooth surface, and tensioning extensions projecting from the preformed part of the member for pulling the preformed part of the member taut against the tooth, said means being sufficiently thin to enter the interproximal tooth spaces.

5. Means for molding the outer surface of a filling in the proximal surface of a tooth in the mouth, said means comprising a smooth surfaced member preshaped to constitute a counterpart of a proximal surface of the tooth as required at the outside of the filling, said member being adapted to embrace less than 360° of the tooth surface, and tensioning extensions projecting from the preformed part of the member in a direction at substantially right angles to a longitudinal axis of a tooth for pulling the preformed part of the member taut against the tooth, said means being sufficiently thin to enter the interproximal tooth spaces, and said extensions being flexible.

HENRY H. LEIB.